US009895944B2

(12) United States Patent
Gout et al.

(10) Patent No.: US 9,895,944 B2
(45) Date of Patent: Feb. 20, 2018

(54) MEASUREMENT MODULE AND ASSEMBLY METHOD FOR SUCH A MODULE ON A WHEEL RIM

(71) Applicants: CONTINENTAL AUTOMOTIVE FRANCE, Toulouse (FR); CONTINENTAL AUTOMOTIVE GmbH, Hannover (DE)

(72) Inventors: Olivier Gout, Cugnaux (FR); Frederic Gaugain, Leguevin (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 113 days.

(21) Appl. No.: 14/962,726

(22) Filed: Dec. 8, 2015

(65) Prior Publication Data
US 2016/0167463 A1    Jun. 16, 2016

(30) Foreign Application Priority Data

Dec. 11, 2014  (FR) ..................... 14 62242

(51) Int. Cl.
*B60C 23/02* (2006.01)
*B60C 23/04* (2006.01)
(Continued)

(52) U.S. Cl.
CPC ...... *B60C 23/0498* (2013.01); *B60C 23/0494* (2013.01); *B60C 29/02* (2013.01); *G01M 17/02* (2013.01)

(58) Field of Classification Search
None
See application file for complete search history.

(56) References Cited

U.S. PATENT DOCUMENTS 5,754,101 A * 5/1998 Tsunetomi .......... B60C 23/0496
340/442
7,886,589 B2 * 2/2011 Capdepon ............... B60C 29/02
73/146
(Continued)

FOREIGN PATENT DOCUMENTS

CN     2419075 Y    2/2001
CN     2686887 Y    3/2005
(Continued)

OTHER PUBLICATIONS

French Search Report, dated Jul. 2, 2015, from corresponding French Application.

*Primary Examiner* — Andre Allen
(74) *Attorney, Agent, or Firm* — Young & Thompson (57) ABSTRACT

A module (25) for measuring at least one parameter of a tire of a wheel of a motor vehicle, the wheel having a wheel rim (1). The measurement module (25) includes an inflation valve (30) designed to be assembled on the wheel rim (1) and including a deformable body (32) and a hollow rod (31) passing through the body (32) including an assembly notch (36) and a sensor device (40), mounted slidingly on the hollow rod (31), including at least one sensor for measuring the value of the parameter and an element (42) for immobilizing the sensor device (40) in the assembly notch (36). The assembly notch (36) has a setting range enabling the movement of the immobilizing element (42) in the assembly notch (36) between a first setting position and a second setting position to adapt to the thickness of the wheel rim (1).

14 Claims, 4 Drawing Sheets

(51) Int. Cl.
*B60C 29/02* (2006.01)
*G01M 17/02* (2006.01)

(56) References Cited

U.S. PATENT DOCUMENTS

| | | | | |
|---|---|---|---|---|
| 8,146,413 B1* | 4/2012 | Grace | ................ | B60C 23/0496 |
| | | | | 73/146.8 |
| 2003/0112137 A1* | 6/2003 | Saheki | ................ | B60C 23/0408 |
| | | | | 340/442 |
| 2006/0090835 A1* | 5/2006 | Mancosu | ................ | B60C 23/04 |
| | | | | 156/110.1 |
| 2007/0113637 A1 | 5/2007 | Blossfeld | | |
| 2008/0121032 A1 | 5/2008 | Qiu et al. | | |
| 2008/0250852 A1* | 10/2008 | Capdepon | ........... | B60C 23/0494 |
| | | | | 73/146.8 |
| 2009/0007649 A1 | 1/2009 | Kempf et al. | | |
| 2012/0312389 A1 | 12/2012 | Kempf | | |
| 2013/0069775 A1 | 3/2013 | Lee et al. | | |
| 2015/0136244 A1* | 5/2015 | Kempf | ................ | B60C 23/0494 |
| | | | | 137/227 |
| 2015/0343861 A1* | 12/2015 | Gosi | ................ | B60C 23/0494 |
| | | | | 137/227 |

FOREIGN PATENT DOCUMENTS

| | | |
|---|---|---|
| CN | 200988401 Y | 12/2007 |
| CN | 101687448 A | 3/2010 |
| CN | 101890885 A | 11/2010 |
| FR | 2 879 505 A1 | 6/2006 |
| FR | 2 899 152 A1 | 10/2007 |
| FR | 2 954 733 A1 | 7/2011 |
| FR | 2 993 823 | 1/2014 |
| WO | 2007/056293 A2 | 5/2007 |
| WO | 2013/104786 A1 | 7/2013 |

* cited by examiner

MEASUREMENT MODULE AND ASSEMBLY METHOD FOR SUCH A MODULE ON A WHEEL RIM

FIELD OF THE INVENTION

The present invention relates to the domain of sensors for motor vehicles, and more specifically to a module for measuring a parameter of a tire, a wheel rim of a motor vehicle having such a module, a vehicle having such a wheel rim, and a method for assembling such a module on a wheel rim of a motor vehicle.

The invention can be used notably to measure the pressure inside a tire of a wheel of a motor vehicle.

BACKGROUND OF THE INVENTION

Figure 1:
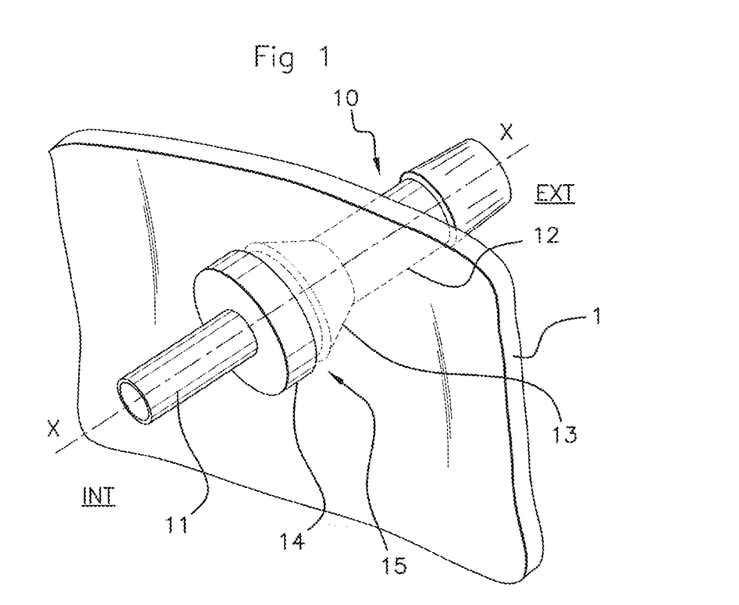
FIG. 1 (as mentioned above) shows an inflation valve from the prior art mounted on a wheel rim.

A motor vehicle includes, in a known manner, a plurality of wheels each having, with reference to FIG. 1, a wheel rim 1 (shown partially), a tire (not shown) and an inflation valve 10 for said tire that is assembled on said wheel rim 1 via an orifice.

Such a valve 10 includes an inflation duct in the form of a hollow rod 11 extending along a longitudinal axis XX, on a portion of which is mounted a deformable rubber body 12 of annular section. Again with reference to FIG. 1, this body 12 includes a first shoulder 13 mounted on the outside EXT of the wheel rim 1 and a second shoulder 14 mounted on the inside INT of the wheel rim 1. Between the first shoulder 13 and the second shoulder 14 is defined a groove 15 for immobilizing the valve 10 in the wheel rim 1, the diameters of the first shoulder 13 and of the second shoulder 14 both being greater than the diameter of the orifice in the wheel rim 1 and the diameter of the immobilizing groove 15 being equal to the diameter of the orifice when the valve 10 is assembled in the wheel rim 1 so as to ensure that the join between same is sealed.

During assembly of the valve 10, same is inserted into the orifice via the inside INT of the wheel rim 1, then the body 12 is pulled or the rod 11 is pushed towards the outside EXT of the wheel rim 1 in order to temporarily deform the first shoulder 13 to enable same to pass through the orifice, thereby positioning said orifice in the immobilizing groove 15. When the body 12 is released, the first shoulder 13 substantially returns to the original shape of same and the valve 10 is assembled on the wheel rim 1, same being immobilized in the immobilizing groove 15 between the first shoulder 13 and the second shoulder 14.

Nowadays, it is known to measure different parameters of the tires of a motor vehicle, notably to inform the user of the condition of same and to warn the user of any anomalies. Such parameters may for example be the pressure inside the tire, the temperature of same, etc. For this purpose, it is known to assemble a sensor device on each valve including one or more sensors designed to measure these parameters and wireless communication means designed to send the measurements to a processor in the vehicle, to process same and, if necessary, inform the user. Such a sensor device is assembled in a known manner on the extremity of the valve rod located in the space inside the tire of each wheel.

Figure 2:
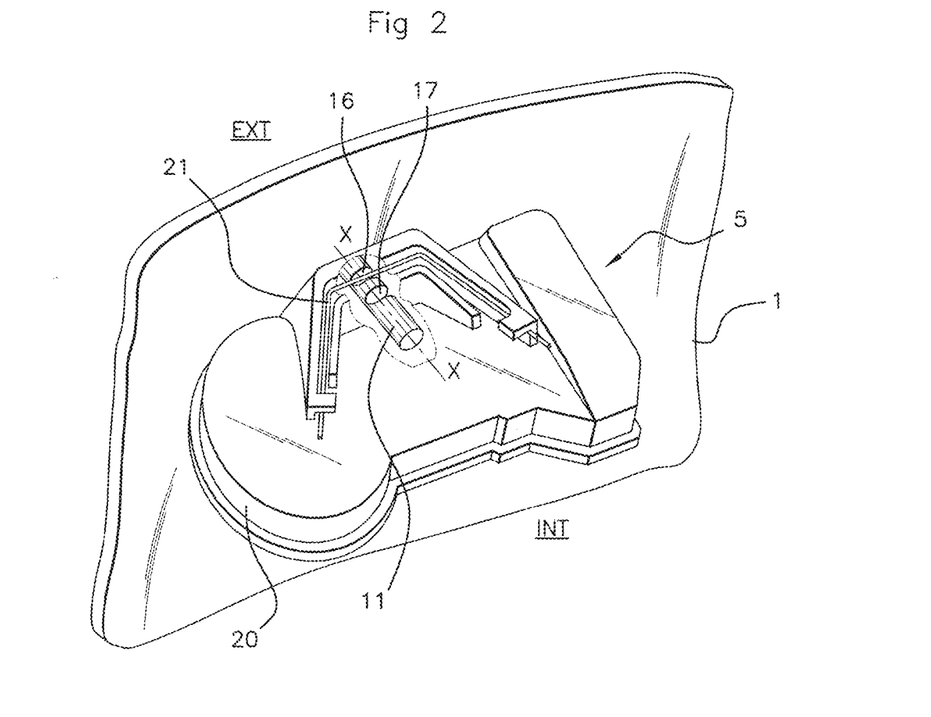
FIG. 2 (as mentioned above) shows a measurement module from the prior art mounted on a wheel rim.

A module 5 for measuring at least one parameter of a tire including a valve 10 (not shown) and a sensor device 20 assembled slidingly on said valve 10 before same is assembled on a wheel rim 1 are known from patent application FR 2 993 823 A1 and with reference to FIG. 2. In order to immobilize the sensor device 20 on the hollow rod 11, the rod 11 has a first notch 16 and a second notch 17 and the sensor device 20 has an immobilizing wire 21. This immobilizing wire 21 is held under tension against the rod 11 to prevent the sensor device 20 from sliding on the rod 11 when it is positioned in the first notch 16 or in the second notch 17. The first notch 16 and the second notch 17 thereby define distinct positions enabling the module 5 to be assembled on wheel rims 1 of different thicknesses, for example between 1.5 and 5 mm. In a "delivery" position, the sensor device 20 is mounted on the hollow rod 11 of the valve 10 as close as possible to the second shoulder 14 (with reference to FIG. 1) of the valve 10, without the immobilizing wire 21 being positioned in the first notch 16 or the second notch 17. Thus, when assembling the valve 10 on the wheel rim 1, when the valve 10 bearing against the wheel rim 1 is pulled, the sensor device 20 slides on the rod 11 under the effect of the stretching of the body 12 of the valve 10, until the immobilizing wire 21 is positioned in the first notch 16.

However, such a module 5 has several drawbacks. Effectively, when sliding the rod 11 into the sensor device 20, the immobilizing wire 21 of the sensor device 20 is immobilized in the first notch 16. Consequently, if the wheel rim 1 is thin, corresponding to the position of the first notch 16, the valve 10 moves directly to the assembly position of same. However, if the wheel rim 1 is thicker, the immobilizing wire 21 is immobilized in the first notch 16 before the first shoulder 13 has passed all the way through the orifice of the wheel rim 1. In this defective position, the valve 10 is not in the assembly position, notably preventing a sealed join between the valve 10 and the wheel rim 1. It is then necessary to remove the immobilizing wire 21 from the first notch 16 in order to enable the sensor device 20 to slide and to enable deformation of the body 12 of the valve 10 in order to assemble the valve 10 into the assembly position of same in the orifice. The sensor device 20 then slides until the immobilizing wire 21 is immobilized in a second notch 17, thereby enabling the valve 10 to reach the assembly position of same. Such an operation to release the immobilizing wire 21 requires a tool and operator intervention, which may be complex and time-consuming, and does not guarantee locking. Furthermore, since the first notch 16 and the second notch 17 define two distinct positions, if the wheel rim 1 is of intermediate thickness, the immobilizing wire 21 falls between the two notches 16, 17, thereby preventing immobilization of the sensor device 20 or only enabling same to be immobilized in the second notch 17.

SUMMARY OF THE INVENTION

The invention is therefore intended to overcome these drawbacks by proposing a simple and reliable solution for assembling a measurement module on a wheel rim.

For this purpose, the invention relates to a module for measuring at least one parameter of a tire of a wheel of a motor vehicle, said wheel comprising a wheel rim, said measurement module comprising:
   an inflation valve designed to be mounted on said wheel rim and including a deformable body and a hollow rod passing through said body, said rod having an assembly notch,
   a sensor device, assembled slidingly on said hollow rod, including at least one sensor for measuring the value of said parameter and means for immobilizing the sensor device in said assembly notch,
   the assembly notch having a setting range enabling the movement of said immobilizing means in the assembly notch between a first setting position and a second setting position to adapt to the thickness of the wheel rim.

Consequently, on account of the setting range, no tools are required to release the sensor device during assembly on a particularly thick wheel rim, the immobilizing means being movable into the assembly notch to adapt the sliding of the sensor device to the thickness of the wheel rim. The assembly notch according to the invention thereby enables all of the assembly positions between a minimum setting position and a maximum setting position of the sensor device. In other words, the measurement module according to the invention can be assembled easily on different wheel rims, the thicknesses of which fall within a range of thicknesses between a minimum thickness and a maximum thickness. The invention therefore makes it possible to avoid defective assembly of the measurement module on the wheel rim while guaranteeing that the join between same is sealed.

Preferably, the setting range is between 2 mm and 7 mm to enable assembly of the measurement module according to the invention on most known models of wheel rims for motor vehicles.

According to one aspect of the invention, the assembly notch includes a first edge defining the first setting position and a second edge defining the second setting position.

According to a characteristic of the invention, the first edge is a stop retaining the sensor device on the rod of the valve. In other words, the first edge is designed to prevent the immobilizing means from coming out of the assembly notch in order to hold the device on the rod of the valve in a position corresponding to the maximum thickness of the wheel rim. For example, since the rod extends along a longitudinal axis, the first edge may be straight and extend substantially orthogonal to the longitudinal axis of the rod. In a variant, the first edge may be straight and inclined or curved.

According to another characteristic of the invention, the second edge is designed to enable the immobilizing means to move into and out of the assembly notch when the sensor device is sliding on the rod. For example, since the rod extends along a longitudinal axis, the second edge may be straight and extend obliquely (i.e. be inclined) in relation to the longitudinal axis of the rod.

Preferably, the assembly notch includes an adjustment plane between the first edge and the second edge in order to define a plurality of assembly positions.

Also preferably, the adjustment plane is substantially parallel to the longitudinal axis of the rod in order to enable a linear movement of the immobilizing means in the assembly notch, thereby facilitating assembly of the measurement module on the wheel rim.

Preferably, the module includes a delivery notch able to receive the immobilizing means before assembly of the measurement module on a wheel rim, i.e. before the sensor device is slid onto the rod of the valve when the valve is being stretched.

Advantageously, the delivery notch is linked to the second edge of the assembly notch by a rounded or projecting portion so as to prevent the immobilizing means from stopping in a defective position between the delivery notch and the assembly notch when sliding the sensor device, such a portion notably enabling sealed assembly of the valve in the orifice of the wheel rim.

The invention also relates to a motor vehicle wheel rim fitted with a measurement module as described above.

The invention also relates to a vehicle having at least one wheel rim as described above.

The invention also relates to a method for assembling a module, as described above, on a wheel rim of a wheel of a motor vehicle, said wheel rim having an orifice for assembling an inflation valve in an assembly position in which the wheel rim is assembled in a groove of the inflation valve, the method including the following steps:

insertion of the inflation valve into said orifice of the wheel rim, stretching of the deformable body of the inflation valve in order to mount same by force in the assembly orifice, sliding of the sensor device on the rod of the inflation valve under the effect of the stretching of said deformable body, insertion of the immobilizing means of the sensor device into the assembly notch of said rod, movement of the immobilizing means in the assembly notch until the inflation valve is in the assembly position of same.

BRIEF DESCRIPTION OF THE DRAWINGS

Other characteristics and advantages of the invention are set out in the description below and shown in the attached drawings, in which.

DETAILED DESCRIPTION OF THE INVENTION

A motor vehicle includes a plurality of wheels, each having, in a known manner, a wheel rim including an orifice, and a tire mounted on said wheel rim. The measurement module according to the invention is designed to be assembled on such a wheel rim through said orifice.

An embodiment of the measurement module according to the invention is described below with reference to FIGS. 3 to 9.

Figure 3:
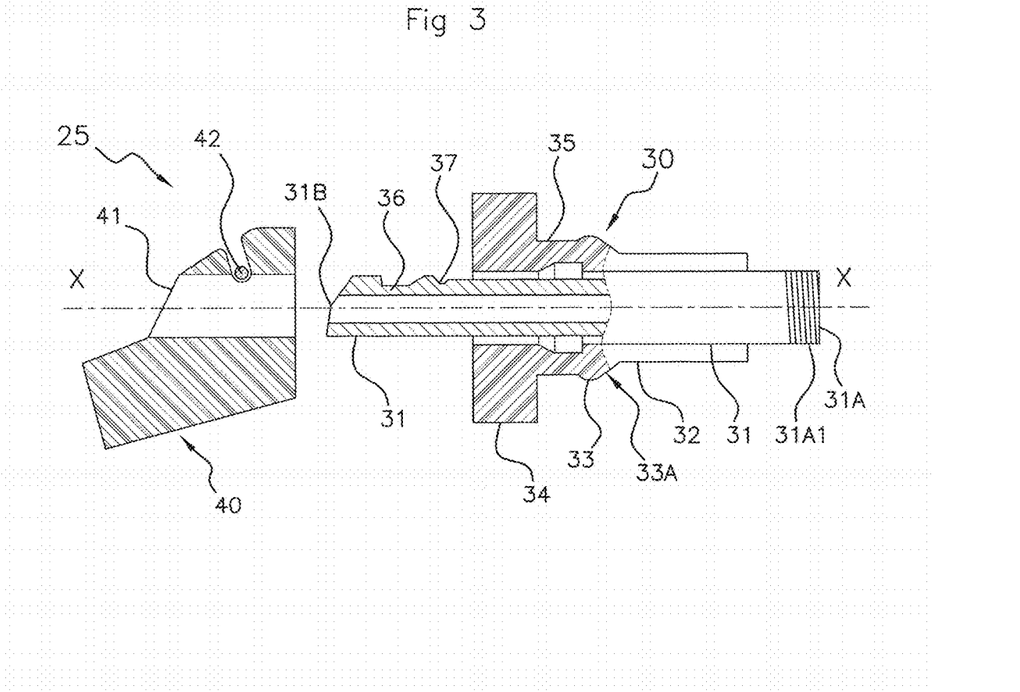
FIG. 3 is a schematic cross section of a measurement module according to the invention.

The measurement module 25 according to the invention includes an inflation valve 30 and a sensor device 40 (see FIG. 3).

The valve 30 includes an inflation duct in the form of a hollow rod 31 extending along a longitudinal axis XX and enabling the passage of air to inflate a tire mounted on a wheel rim 1, 1A, 1B, 1C fitted with the measurement module 25.

The hollow rod 31 is made of metal, preferably steel or brass. The hollow rod 31 has a first extremity 31A, a second extremity 31B and a deformable body 32 of annular section surrounding a portion of the hollow rod 31 between said first extremity 31A and said second extremity 31B.

This deformable body 32 is made of an elastic material, such as rubber. This body 32 includes a first shoulder 33 and a second shoulder 34 that together form an immobilizing groove 35. The respective diameters of this first shoulder 33 and of this second shoulder 34 are greater than the diameter of the orifice of the wheel rim 1, 1A, 1B, 1C such as to immobilize the valve 30 when same is assembled in the orifice of the wheel rim 1, 1A, 1B, 1C in the usage position.

The face 33A of the first shoulder 33 located on the side opposite the immobilizing groove 35 is tapered in order to facilitate insertion of the body 32 into the orifice of the wheel rim 1, 1A, 1B, 1C.

Figure 7:
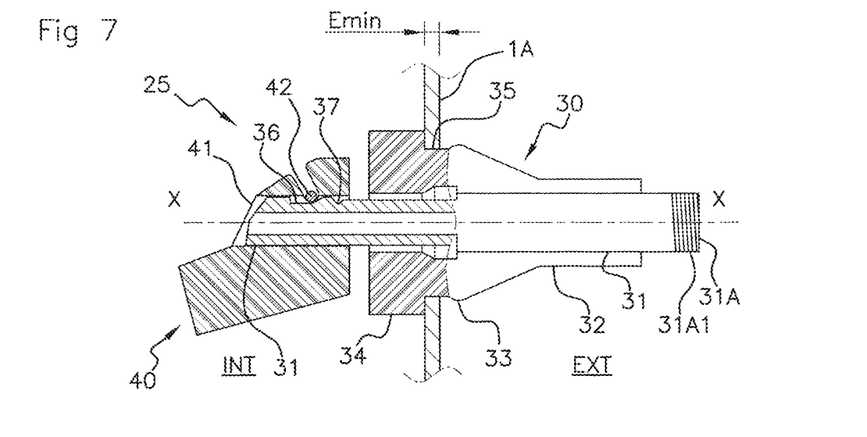
FIG. 7 is a schematic cross section of the measurement module in FIG. 3 assembled on a thin wheel rim.
Figure 8:
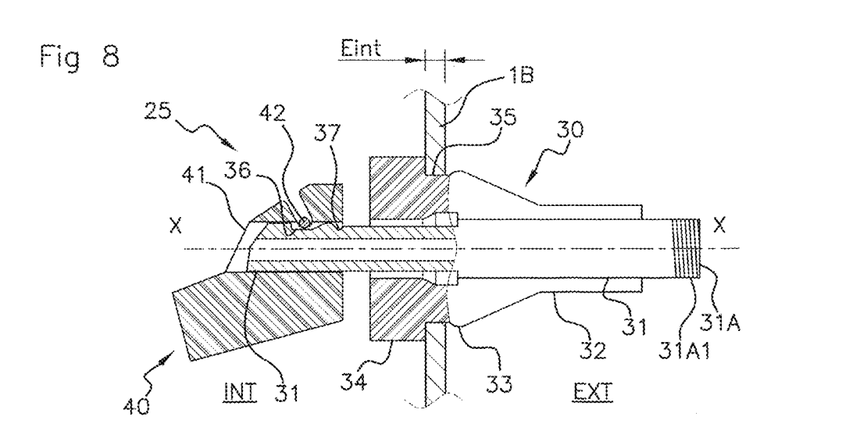
FIG. 8 is a schematic cross section of the measurement module in FIG. 3 assembled on a wheel rim of intermediate thickness.
Figure 9:
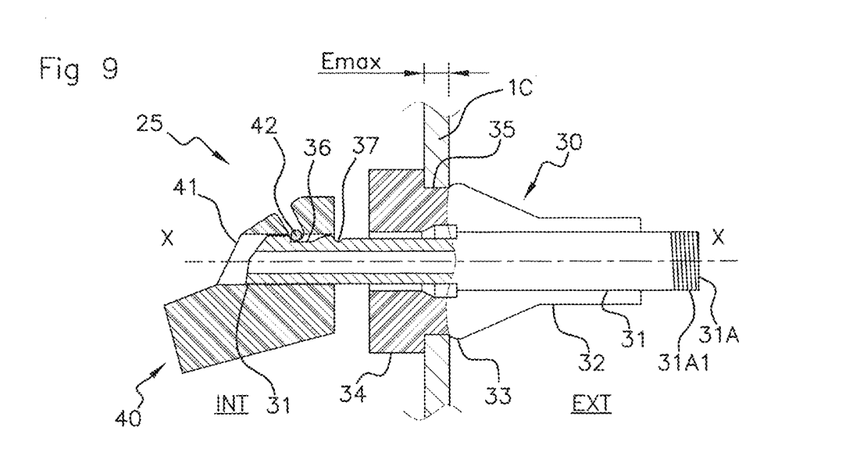
FIG. 9 is a schematic cross section of the measurement module in FIG. 3 assembled on a thick wheel rim.

The first extremity 31A has a thread 31A1 designed to receive a cap (not shown) for closing the inflation duct. In the assembly position of the measurement module on the wheel rim 1A, 1B, 1C, as shown in FIGS. 7 to 9, the hollow rod 31 passes through the orifice of the wheel rim 1 such that the first threaded extremity 31A and the closing cap are on the outside EXT of the wheel rim 1A, 1B, 1C to enable a tire (not shown) mounted on the wheel rim 1A, 1B, 1C to be inflated.

As shown in FIGS. 3 to 9, the rod 31 includes an assembly notch 36 followed by a delivery notch 37, considered in the direction of the first extremity 31A from the second extremity 31B. The assembly notch 36 defines a range of assembly positions for the sensor device 40 in relation to the valve 30 enabling assembly of the measurement module 25 to be adapted to a plurality of thicknesses of wheel rim 1, 1A, 1B, 1C.

Again with reference to FIGS. 3 to 9, the sensor device 40 has a cylindrical opening 41 in which the hollow rod 31 slides and means for immobilizing the sensor device 40 on said hollow rod 31 in the form of a metal immobilizing wire 42 with a tensile strength, for example, of at least 500 MPa. Naturally, these immobilizing means may be in any other suitable form, such as a strip, pin, stud, etc.

Figure 4:
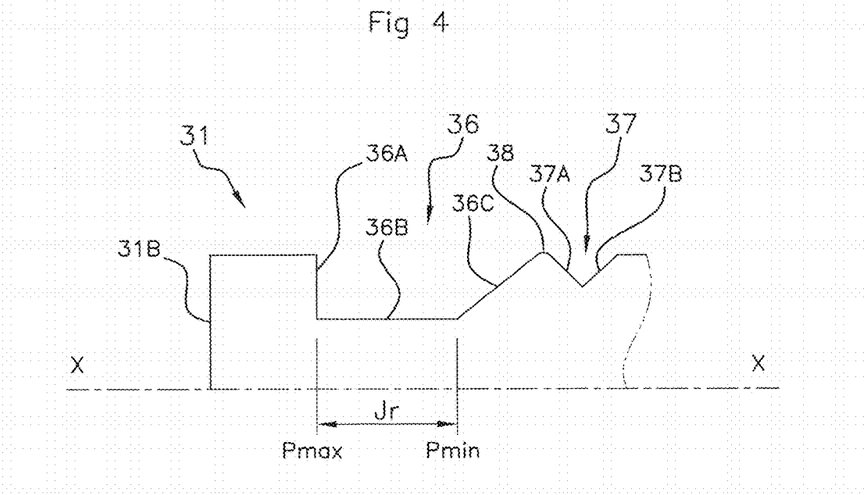
FIG. 4 is a partial schematic view of the rod of the measurement module shown in FIG. 3.

The immobilizing wire 42 is held under tension against the hollow rod 31 to be inserted in the assembly notch 36 or the delivery notch 37 as applicable. For this purpose, the sensor device 40 includes means for holding the immobilizing wire 42 under tension, for example a tension, torsion or traction spring. This tension makes it easy to switch from the delivery position to an assembly position when assembling the measurement module in the wheel rim 1, 1A, 1B, 1C and from an assembly position to the delivery position when the measurement module 25 of the wheel rim 1, 1A, 1B, 1C is being removed, for example for reuse.

With reference to FIG. 4, the assembly notch 36 has a first edge 36A, an adjustment plane 36B and a second edge 36C, arranged from the second extremity 31B towards the first extremity 31A. In this example, the adjustment plane 36B is substantially parallel to the longitudinal axis XX of the rod 31 so as to enable a linear movement of the immobilizing wire 42 in the assembly notch 36.

The first edge 36A defines a first maximum setting position Pmax for the immobilizing wire 42 in the assembly notch 36. This first edge 36A forms a stop for the immobilizing wire 42. In this example, the first edge 36A is straight and extends orthogonal to the longitudinal axis XX of the valve 30.

The second edge 36C defines, at the junction of same with the adjustment plane 36B, a second minimum setting position Pmin for the immobilizing wire 42. This second edge 36C is inclined in relation to the longitudinal axis XX of the valve 30 to enable the immobilizing wire 42 to switch between the delivery position and a setting position in the assembly notch 36.

The adjustment plane 36B thus defines a setting range Jr that enables the sensor device 40 to be held on the rod 31 while enabling same to slide on the rod 31 between the first maximum setting position Pmax and the second minimum setting position Pmin of the immobilizing wire 42. By way of nonlimiting example, the setting range Jr may be between 2 and 7 mm.

The delivery notch 37, which is positioned between the assembly notch 36 and the body 32 of the valve 30, is able to receive the immobilizing wire 42 before the measurement module 25 is assembled on the wheel rim 1, 1A, 1B, 1C, i.e. before the sensor device 40 slides on the rod 31 of the valve 30 when the valve 30 is stretched. This position of the sensor device 40 on the rod of the valve 30 is referred to as the "delivery position".

Again with reference to FIG. 4, this delivery notch 37 is shallow, for example around 0.5 mm, to enable the sensor device 40 to be held as close as possible to the deformable body 32, while enabling said sensor device 40 to be easily released under the effect of elongation of the body 32 of the valve 30.

The delivery notch 37 has a first edge 37A and a second edge 37B. The first edge 37A, located on the side of the assembly notch 36, is inclined in relation to the longitudinal axis XX of the valve 30 to enable immobilizing means of the sensor device 40 to be switched between the delivery position and an assembly position of the sensor device 40 on the rod 31.

In this example, the first edge 37A of the delivery notch 37 and the second edge 36C of the assembly notch 36 are joined at a rounded portion 38 such that the measurement module 25 does not provide an intermediate stopping position for the immobilizing wire 42 between the delivery position and a setting position in the assembly notch 36, the incline of these edges 37A, 36C guiding the measurement module 25 towards one or other of these positions.

The sensor device 40 also has at least one sensor (not shown) for measuring at least one parameter of a tire mounted on the wheel rim 1, 1A, 1B, 1C to which the measurement module 25 is attached. These parameters may for example be the pressure inside the tire, the temperature of same, etc.

The sensor device 40 may finally include wireless communication means (not shown) designed to send these measurements to a processor in the vehicle for processing, in particular to inform the driver of the vehicle of the condition of the tires of same and to warn the driver of any anomalies.

Figure 5:
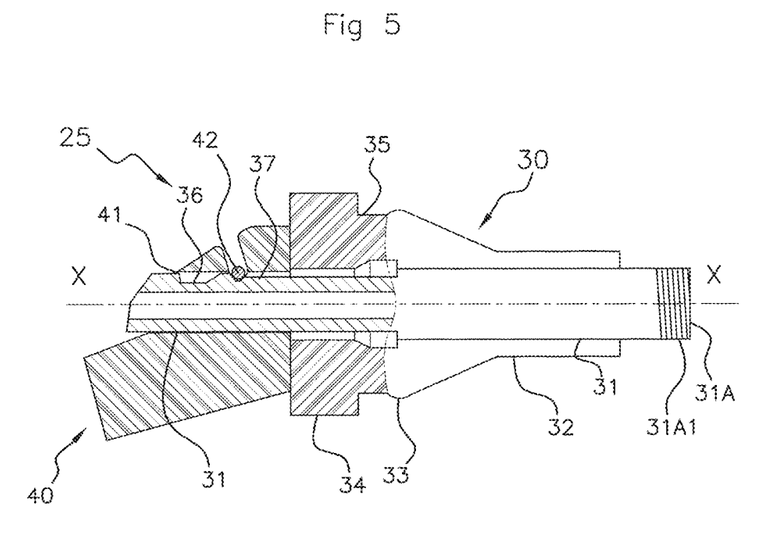
FIG. 5 is a schematic cross section of the measurement module in FIG. 3 in delivery position.

As shown in FIG. 5, the sensor device 40 is mounted on the rod 31 of the inflation valve 30 in the delivery position before assembly of the measurement module 25 on a wheel rim 1, 1A, 1B, 1C (with reference to FIGS. 6 to 9). In this delivery position, the sensor device 40 is mounted as close as possible to the second shoulder 34 of the body 32 of the valve 30.

Figure 6:
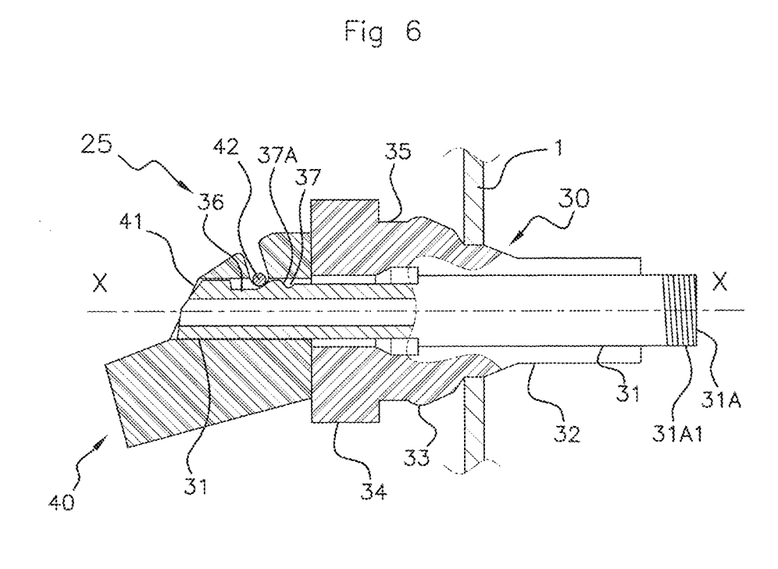
FIG. 6 is a schematic cross section of the deformation of the body of a valve of the measurement module in FIG. 3 during insertion of same into a wheel rim.

With reference to FIG. 6, during assembly of the measurement module on the wheel rim 1, the inflation valve 30 is inserted into the orifice in the wheel rim 1, from the inside INT of the wheel rim 1, then the body 32 is pulled from the outside EXT or the rod 31 is pushed towards the outside EXT of the wheel rim 1 in particular to temporarily deform the first shoulder 33.

This deformation makes it possible to reduce the diameter of the first shoulder 33 to insert same by force in the orifice in the wheel rim 1. This deformation also results in an elongation of the body 32 of the valve 30, the second shoulder 34 bearing against the inside of the wheel rim 1. Under the effect of this elongation, the rod 31 slides into the opening 41 in the sensor device 40 and the immobilizing wire 42 of the sensor device 40 comes out of the delivery notch 37, being guided along the inclined first edge 37A of the delivery notch 37.

The immobilizing wire 42 is then guided along the second edge 36C (see FIG. 4) of the assembly notch 36 until all of the first shoulder 33 has entered the orifice of the wheel rim 1. Once the first shoulder 33 has passed the orifice of the wheel rim 1, the body 32 of the valve 30 is released, the first shoulder 33 substantially returns to the initial shape of same and the valve 30 is mounted on the wheel rim 1, same being immobilized between the first shoulder 33 and the second shoulder 34 in an assembly position guaranteeing the seal between the valve 30 and the wheel rim 1.

The measurement module 25 according to the invention is designed to be mounted on a plurality of wheel rims of different thicknesses between a minimal thickness Emin and a maximal thickness Emax.

In the case of a wheel rim 1A of minimal thickness Emin, as shown in FIG. 7, the sensor device 40 is in an assembly position corresponding to the second minimum setting position Pmin of the immobilizing wire 42 in the assembly notch 36.

In the case of a wheel rim 1B of intermediate thickness Eint, between the minimal thickness Emin and the maximal thickness Emax, as shown in FIG. 8, the sensor device 40 is in an assembly position corresponding to an intermediate position of the immobilizing wire 42 between the minimum setting position Pmin and the maximum setting position Pmax. In this case, the immobilizing wire 42 is positioned on the adjustment plane 36B between the first edge 36A and the second edge 36C of the assembly notch 36.

In the case of a wheel rim 1C of maximal thickness, as shown in FIG. 9, the sensor device 40 is in an assembly position corresponding to the maximum setting position Pmax of the immobilizing wire 42 in the assembly notch 36. In this case, the immobilizing wire 42 is positioned to butt against the first edge 36A of the assembly notch 36.

During maintenance work on the measurement module 25 according to the invention, said measurement module 25 can be removed by force from the wheel rim 1, 1A, 1B, 1C. Once removed, the sensor device 40 can slide from an assembly position to the delivery position using the inclined second edge 36C of the assembly notch 36, thereby enabling the immobilizing wire 42 to be inserted in the delivery notch 37. Such an operation makes it possible to reuse the measurement module 25 to reassemble same on a wheel rim 1, 1A, 1B, 1C.

The setting range Jr of the assembly notch 36 thus advantageously makes it possible to adjust the position of the sensor device 40 as a function of the thickness of the wheel rim 1, 1A, 1B, 1C on which the measurement module 25 is assembled. Such a measurement module 25 according to the invention is therefore easy to assemble on a wheel rim 1, 1A, 1B, 1C and adapts to the thickness of the wheel rim 1, 1A, 1B, 1C with no action required of an operator other than to pull the valve 30 through the orifice of the wheel rim 1, 1A, 1B, 1C.

Furthermore, on account of the inclined first edge 37A of the delivery notch 37 and of the inclined second edge 36C of the assembly notch 36, the immobilizing wire 42 switches directly from the delivery notch 37 to the assembly notch 36, which prevents the measurement module 25 from being in a defective assembly position of the measurement module 25 on the wheel rim 1, 1A, 1B, 1C while guaranteeing the seal of the join between the valve 30 and the wheel rim 1, 1A, 1B, 1C.

Furthermore, there is no need to use an unlocking tool for the immobilizing wire 42 when assembling the sensor device 40 on the valve 30, or during removal of the measurement module 25, since the immobilizing wire 42 can come out of the assembly notch 36 to switch into the delivery notch 37 via the second wall 36C of the assembly notch 36.

The invention claimed is:

1. A module for measuring at least one parameter of a tire of a wheel of a motor vehicle, said wheel comprising a wheel rim, said measurement module comprising:
    an inflation valve configured to be mounted on said wheel rim and including a deformable body and a hollow rod passing through said body, said rod having an assembly notch;
    a sensor device, assembled slidingly on said hollow rod, including at least one sensor for configured to measure the value of said parameter and an immobilizing device configured to immobilize the sensor device in said assembly notch,
    wherein the assembly notch has a setting range enabling the movement of said immobilizing device in the assembly notch between a first setting position and a second setting position to adapt to the thickness of the wheel rim.

2. The measurement module as claimed in claim 1, wherein the setting range is between 2 mm and 7 mm.

3. The measurement module as claimed in claim 1, wherein the assembly notch has a first edge defining the first setting position and a second edge defining the second setting position, the first edge being a retaining stop for the sensor device on the rod of the valve.

4. The measurement module as claimed in claim 3, wherein the second edge is configured to enable the immobilizing device to move into and out of the assembly notch when the sensor device is sliding on the rod.

5. The measurement module as claimed in claim 3, wherein the assembly notch includes an adjustment plane between the first edge and the second edge.

6. The measurement module as claimed in claim 5, wherein, since the rod extends along a longitudinal axis, the adjustment plane is parallel to the longitudinal axis.

7. The measurement module as claimed in claim 1, further comprising a delivery notch configured to receive the immobilizing device before assembly of the measurement module on a wheel rim.

8. A motor vehicle wheel rim comprising:
    the measurement module as claimed in claim 1, mounted on said wheel rim.

9. A vehicle comprising:
    at least one wheel rim as claimed in claim 8.

10. A method for assembling the module, as claimed in claim 1, on a wheel rim of a wheel of a motor vehicle, said wheel rim having an orifice for assembling an inflation valve in an assembly position in which the wheel rim is mounted in a groove of the inflation valve, the method comprising:
    inserting the inflation valve into said orifice of the wheel rim;
    stretching the deformable body of the inflation valve in order to mount the inflation valve by force in the assembly orifice;

sliding the sensor device on the rod of the inflation valve under the effect of the stretching of said deformable body;

inserting the immobilizing device of the sensor device into the assembly notch of said rod; and moving the immobilizing device in the assembly notch until the inflation valve is in the assembly position of the inflation valve.

11. The measurement module as claimed in claim 2, wherein the assembly notch has a first edge defining the first setting position and a second edge defining the second setting position, the first edge being a retaining stop for the sensor device on the rod of the valve.

12. The measurement module as claimed in claim 11, wherein the second edge is configured to enable the immobilizing device to move into and out of the assembly notch when the sensor device is sliding on the rod.

13. The measurement module as claimed in claim 4, wherein the assembly notch includes an adjustment plane between the first edge and the second edge.

14. The measurement module as claimed in claim 13, wherein, since the rod extends along a longitudinal axis, the adjustment plane is parallel to the longitudinal axis.

* * * * *